Jan. 18, 1966 A. R. PEARLMAN 3,230,468
APPARATUS FOR COMPENSATING A TRANSISTOR FOR THERMAL
VARIATIONS IN ITS OPERATING POINT
Filed Dec. 24, 1962 2 Sheets-Sheet 1

*INVENTOR.*
ALAN R. PEARLMAN
BY
Rosen & Schiller
ATTORNEYS

Jan. 18, 1966 A. R. PEARLMAN 3,230,468

APPARATUS FOR COMPENSATING A TRANSISTOR FOR THERMAL VARIATIONS IN ITS OPERATING POINT

Filed Dec. 24, 1962 2 Sheets-Sheet 2

INVENTOR.
ALAN R. PEARLMAN

BY

Rosen & Schiller
ATTORNEYS

United States Patent Office 3,230,468
Patented Jan. 18, 1966

3,230,468

APPARATUS FOR COMPENSATING A TRANSISTOR FOR THERMAL VARIATIONS IN ITS OPERATING POINT

Alan R. Pearlman, Watertown, Mass., assignor to Nexus Research Laboratory, Inc., Dedham, Mass., a corporation of Massachusetts Filed Dec. 24, 1962, Ser. No. 246,769
13 Claims. (Cl. 330—23)

This invention concerns transistor circuits, and more particularly the stabilization of thermally caused variations in transistor characteristics.

When operating a transistor, particularly a junction transistor in a common-emitter or common-collector configuration, the base current-collector current relationship is at least in part dependent upon thermal variations in collector leakage current ($I_{CBO}$) and in the D.C. current gain ($h_{FE}$) of the transistor. Thus, current flowing through resistance in the base circuit of an uncompensated transistor will produce a thermally dependent voltage drop. Such a voltage drop creates a variation in the transistor operating point which is quite undesirable, particularly in the case of D.C. amplifiers where the thermal variations in the operating point may be indistinguishable from desired variations produced by applied signals. If the input signal source has a resistive impedance of any significant magnitude, the base circuit thermal current will introduce spurious voltage changes. Further, in some cases, changes in transistor characteristics resulting from heat generated during normal operation causes a condition known as thermal runaway which can result in the destruction of a transistor.

Several approaches have been taken to provide circuitry which is intended to compensate for thermal instability of transistor operating point. Among the many suggested methods are some which employ one or more other transistors to provide stabilization. The stabilization thus provided is considered superior to other methods in that the distortion introduced is minimized. A discussion of some circuits using compensating transistors may be found at pages 95 through 97 of Basic Theory and Application of Transistors, Department of the Army Technical Manual TM–11690, March 1959. A circuit using the base current of a complementary compensating transistor, matched to provide similar thermal characteristics, is disclosed by H. W. Parmer in Electronics, October 24, 1962, at pages 56 to 58.

The bulk of transistors employed today are either silicon or germanium basically. In silicon transistors, $I_{CBO}$ is usually negligible compared to the effect of $H_{FE}$. In germanium transistors, the relative effect of the two terms may be reversed. The type of circuits disclosed in the above-mentioned pages of the Army Technical Manual are primarily directed toward compensating for $I_{CBO}$. The circuit disclosed in the appropriate pages of the above-mentioned Electronics article requires the matching of characteristics of an NPN with a PNP transistor, so that they both have similar variations over an appropriate temperature range in $I_{CBO}$ and $H_{FE}$. Because complementary transistors matched in this manner are not readily available, the requirement is burdensome and costly.

A principal object of the present invention is therefore to provide apparatus for accurately and readily compensating a transistor for thermal variations in its operating point. Another object is to provide transistor circuitry for compensating thermal variations in the base current of a transistor in common-collector or common-emitter configuration, whereby in operation of the latter, the voltage drop across base circuit input resistance is due substantially only to the input signal.

Other objects are to provide transistor circuitry for compensating a transistor of a predetermined conductivity type through the use of one or more transistors of like conductivity type; to provide such circuitry which is simply constructed from readily available components; to provide such circuitry to temperature stabilize the collector current of the transistor being compensated; and to provide a thermal effect compensation circuit for a transistor amplifier, wherein said circuit comprises a compensating transistor of the same conductivity type as the input transistor of said amplifier, a substantially constant current source connected to the collector of the compensating transistor, a base-collector feedback circuit around the compensating transistor and having a resistive component therein, means coupling said collector to said resistive component for providing a temperature-variable voltage which drives a current through the resistance to the base, and means for coupling said voltage through another resistance to the base of the input transistor.

Other objects of the present invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
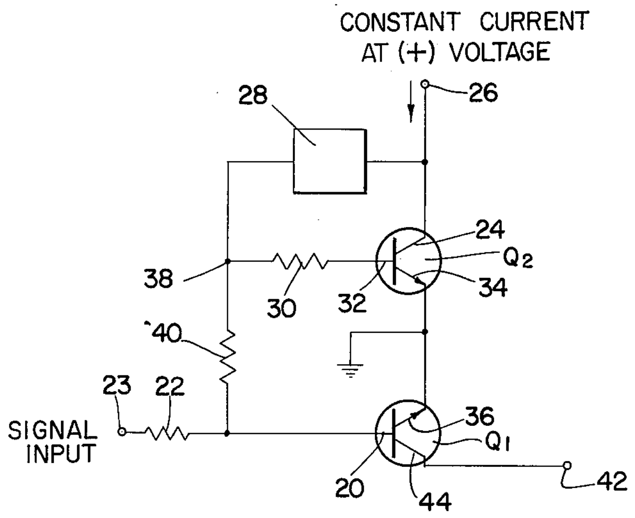
FIG. 1 is a schematic circuit diagram showing a transistor amplifier in common-emitter configuration compensated with a circuit embodying the principles of the present invention.

Referring now to the drawing, wherein like numerals and letters denote like parts, there will be seen in FIG. 1 an amplifying transistor $Q_1$ of a given conductivity type, illustrated as an NPN transistor. Transistor $Q_1$ has its base 20 connected to an input resistance shown as resistor 22, which is adapted to have a source of input signal coupled thereto as at terminal 23.

As means for compensating transistor $Q_1$ for thermal variations in its current gain $H_{FE}$ and leakage current $I_{CBO}$, there is provided a source of temperature variable voltage for driving through base 20 a predeterminedly established compensating current. As shown in FIG. 1, such means includes compensating transistor $Q_2$ of the same conductivity type as transistor $Q_1$, the two transistors being selected so that the characteristics of both are matched, i.e. exhibit substantially the same type of function with respect to $I_{CBO}$ and $H_{FE}$, as well as the base-emitter resistances, over a desired ambient temperature range, for instance from —50° to 130° C.

Collector 24 of transistor $Q_2$ is connected to a constant current source (not shown) as at terminal 26. Circuits which provide such constant current sources are well known in the art and need not be described here. As transistor $Q_2$ is shown as an NPN type transistor, terminal 26 is at a positive voltage with respect to, in this embodiment, ground. Collector 24 is also connected through coupling means 28 and thence through a resistance such as resistor 30, to base 32 of transistor $Q_2$. Coupling means 28 can be a dead short circuit between collector 24 and resistor 30, can be a single passive or active element, or can be a network of passive or active components or a combination of passive and active components.

Emitter 34 of transistor $Q_2$ is connected to emitter 36 of transistor $Q_1$, both emitters being shown as grounded. A point 38 in the base-emitter circuit of transistor $Q_2$, intermediate coupling means 28 and resistor 30, is connected through a resistance, such as resistor 40, to base 20 of transistor $Q_1$. The output of transistor $Q_1$ is found at terminal 42 which is connected to collector 44 of transistor $Q_1$.

In operation, current flowing at terminal 26 is provided from a constant current source of any of the many known types. A portion ($I_C$) of this constant current then flows in collector 24 when collector-emitter circuit of transistor $Q_2$ is properly biased, preferably at a voltage below the level at which transistor $Q_2$ saturates. Another portion ($I_B$) of this constant current flows through coupling means 28 and resistor 30 ($R_B$). If the transistor gain ($h_{FE}$) is high, $I_C$ will be considerably larger than $I_B$ and any thermal variations in $H_{FE}$ will be reflected by a relatively small proportionate change in $I_C$ (so that the latter tends to stay approximately fixed) and a relatively large proportionate change in $I_B$.

The current $I_B$ generates a voltage drop across resistor 30 and if coupling means 28 is assumed to be a short circuit, the collector-emitter voltage ($V_{CE}$) appearing at point 38 is essentially determined by ($I_BR_B$) and $V_{BE}$, the base-emitter voltage of transistor $Q_2$. It will be appreciated that both the preceding terms are temperature-dependent. Therefore, the collector-emitter voltage $V_{CE}$ will vary to drive the correct amount of current through the base 32 of transistor $Q_2$ necessary to meet the requirement that the current at terminal 26 be substantially constant. In other words, the feedback loop from collector 24 of transistor $Q_2$ to its base 32 generates a voltage, such as is found at point 38, which provides base current to transistor $Q_2$ for keeping the operating point of transistor $Q_2$ at a constant value regardless of thermal variations in $I_{CBO}$, $H_{FE}$ and $V_{BE}$ of transistor $Q_2$.

Point 38 is connected to base 20 of transistor $Q_1$ through resistor 40. Therefore, if transistor $Q_2$ is selected so that its $I_{CBO}$, $H_{FE}$ and $V_{BE}$ are all temperature functions of the same type as transistor $Q_1$, i.e. the operating characteristics of transistor $Q_1$ are matched so that they will track well with transistor $Q_2$, current driven through resistor 40 by virtue of the thermally varying voltage appearing at point 38 will provide a current to base 20 which varies in a similar temperature-dependent manner to that flowing at base 32. This will have the effect of providing a collector current at collector 44 of transistor $Q_1$ which is substantially constant with respect to thermal variations in the operating characteristics of the latter. However, variations in base current on base 20 imposed by a signal applied at terminal 23, will provide variations in the collector current of transistor $Q_1$ which variations will be apparent in the output signal at output terminal 42. Therefore, when transistors $Q_1$ and $Q_2$ have similar characteristics and are subjected to the same operating temperature, changes in voltage at point 38 resulting from the feedback loop around transistor $Q_2$ responsive to changes in $I_{CBO}$ and $V_{BE}$ of transistor $Q_2$, will provide a current to the base of transistor $Q_1$ for compensating similar changes in the latter. In order that the operating temperatures of the two transistors be matched, they should be thermally coupled by mounting them together within the same region of ambient temperature.

Coupling means 28 is ideally a non-inverting, isolating D.C. amplifier with substantially infinite input impedance. This would insure that no part of the current flowing through terminal 26 is diverted to the collector-base circuit of transistor $Q_2$ and thus the collector current of transistor $Q_2$ is as constant as the source at terminal 26 can provide. Alternatively, coupling means 28 can take the form of a power source such as a battery which, when appropriately poled would insure that the collector-base junction of transistor $Q_2$ is always reverse-biased. Coupling means 28 can also take other forms such as, for example, a constant voltage diode, an RC network, a simple resistor, a dead short and many other forms, depending largely on what approximation of constant collector current is considered acceptable.

Figure 2:
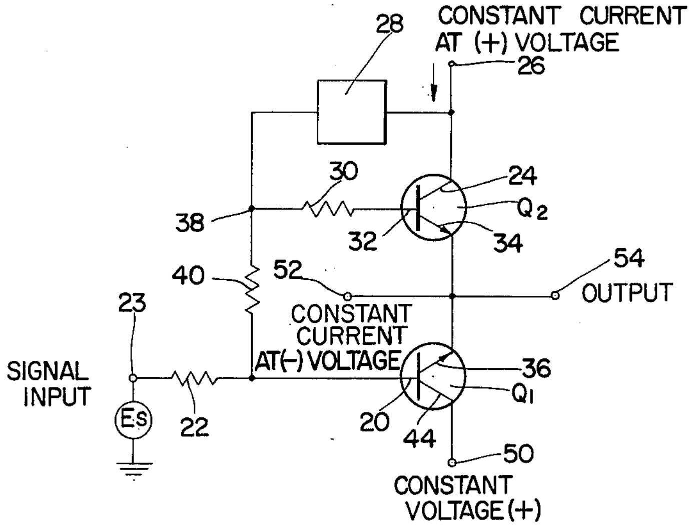
FIG. 2 is a schematic thermal compensation circuit diagram employing a transistor amplifier in emitter-follower configuration and embodying the principles of the present invention.

Referring now to FIG. 2 there will be seen a circuit similar to that of FIG. 1 in which, however, the amplifying transistor $Q_1$ is in an emitter-follower configuration. The circuit includes means for compensating transistor $Q_1$ for thermal variations in $I_{CBO}$, $H_{FE}$ and $V_{BE}$. Such means includes compensating transistor $Q_2$ of the same conductivity type as transistor $Q_1$, matched to the latter in the same manner as the transistors of FIG. 1 were matched. Transistor $Q_2$ includes collector 24, emitter 34, base 32, and a source of substantially constant current at terminal 26 connected directly to collector 24. Collector 24 is also connected through coupling means 28 and series resistance such as resistor 30 to base 32. It will be apparent that, in operation, the voltage appearing at point 38 intermediate coupling means 28 and resistor 30 will be a thermally dependent voltage for driving to base 32 the current necessary to accord to the fact that the collector of transistor $Q_2$ is held at a substantially constant value.

Again, as in FIG. 1 point 38 is coupled through resistor 40 to base 20 of transistor $Q_1$. However, collector 44 of transistor $Q_1$ is connected to terminal 50 which is maintained at a constant voltage (which of course is positive when transistor $Q_1$ is of NPN type) provided by any of the many known constant value voltage sources. Emitter 36 of transistor $Q_1$ is connected to emitter 34 of transistor $Q_2$ and also to a constant current source (not shown) as at terminal 52, the latter being maintained at a negative voltage. In this embodiment, the output of transistor $Q_1$ appears at terminal 54 which is connected to emitter 36 of transistor $Q_1$.

It will be seen that the thermally dependent voltage appearing at point 38 in the collector-base feedback loop around transistor $Q_2$ will provide a base current to base 20 of transistor $Q_1$. This base current provided by appropriate choice of resistor 40, can be established so as to be substantially equal to the temperature-dependent base current ($I_C/h_{FE}-I_{CBO}$) which would flow in an uncompensated transistor (identical to $Q_1$) having its base shorted to ground and its emitter and collecter coupled to respective current and voltage sources as shown in FIG. 2. The collector current flowing in transistor $Q_1$ in the absence of any voltage bias on base 20 will be determined by the difference between the current flowing in collector 24 of transistor $Q_2$ and the current flowing at terminal 52. Therefore, any signal input imposed at terminal 23 and connected, as through resistance 22 to base 20, will provide variations in the amplified output of transistor $Q_1$, which variations are independent of thermal changes in the operating characteristics of transistor $Q_1$. This embodiment illustrates the use of the compensating current provided from the voltage ($V_{CE}$) developed in the circuit of transistor $Q_2$, in overcoming thermal voltage drops in the base input resistance of an emitter follower.

In both the embodiments of FIGS. 1 and 2 it will be appreciated that if transistors $Q_1$ and $Q_2$ of each embodiment are very closely matched so that the thermal variations of their characteristics are virtually identical, the base resistances 30 and 40 respectively connecting point 38 with the bases of transistors $Q_2$ and $Q_1$ will preferably be identical resistors , i.e. have the same ohmic value. If the transistors are matched to show only the same characteristic curves, i.e. the same function but differing in coordinate values, resistances 30 and 40 can be respectively selected accordingly as to value.

Figure 3:
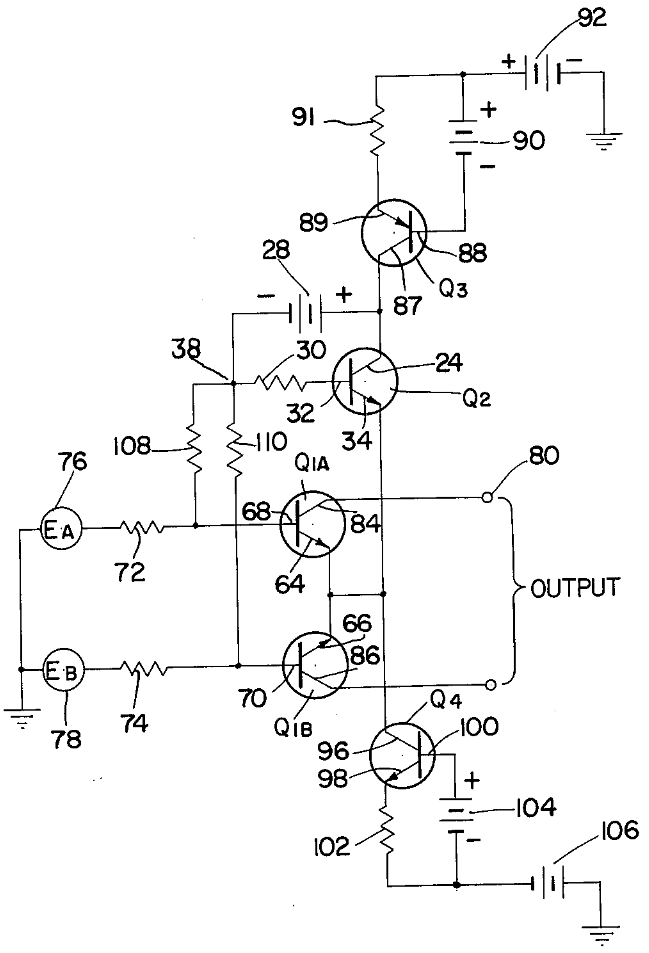
FIG. 3 is a schematic circuit diagram of yet another embodiment of the present invention for compensating a differential amplifier configuration.

In the embodiment of the invention shown in FIG. 3 in somewhat more detailed form than that of FIG. 1 or 2, there is shown an application of the principles of the present invention to a differential amplifier. In the form shown, the differential amplifier includes a pair of NPN transistors $Q_{1A}$ and $Q_{1B}$ having their respective emitters 64 and 66 coupled to one another. The respective bases 68 and 70 of transistors $Q_{1A}$ and $Q_{1B}$ are connectable through corresponding resistors 72 and 74 to two discrete levels of input signals delivered as from sources 76 and 78. Resistors 72 and 74 can be considered part of the output impedance of the respective sources. As is well known in the art, the amplified difference between the levels of input signals from sources 76 and 78 is provided across output terminals 80 and 82, the latter being respectively connected to collector 84 of transistor $Q_{1A}$ and collector 86 of transistor $Q_{1B}$, while the common mode signal is substantialy rejected. As in the embodiment hereinbefore described, transistors $Q_{1A}$ and $Q_{1B}$ will exhibit variations in their operating point responsive to thermal changes in their $I_{CBO}$, $H_{FE}$ and $V_{BE}$ values. Consequently, at least for the purposes of the present invention it is desirable that both transistors $Q_{1A}$ and $Q_{1B}$ be carefully matched to one another with respect to the above-described characteristics. The differential amplifier exemplified by coupled transistors $Q_{1A}$ and $Q_{1B}$ is thermally compensated by means including compensating transistor $Q_2$ which is of the same conductivity type as transistors $Q_{1A}$ and $Q_{1B}$ and preferably matched as hereinbefore described for thermal tracking. Emitter 34 of transistor $Q_2$ is connected to the coupled emitter of transistors 60 and 62. Collector 24 of transistor $Q_2$ is connected through coupling means, such as a power source or battery 28 in series with base resistor 30 to base 32 of transistor $Q_2$. Battery 28 is poled so that its positive terminal is connected to emitter 24. Collector 24 is also connected to a constant current source which in the form shown comprises transistor $Q_3$ whose collecter 87 is directly connected to collector 24 of transistor $Q_2$. Base 88 of transistor $Q_3$ is connected to its emitter 89 through an electrical power source, such as battery 90, in series with resistor 91. Because transistor $Q_3$ is shown as a PNP transistor, battery 90 is arranged so that base 88 is coupled to the negative terminal of the battery. A point intermediate the positive terminal of battery 90 and resistor 91 is connected to the positive side of another electrical power source, such as battery 92, the negative side of the latter being connected to ground.

The circuit of FIG. 3 also includes another constant current source which in the form shown comprises transistor $Q_4$ having its collector 96 connected to the emitters of transistors $Q_{1A}$, $Q_{1B}$ and $Q_2$. The emitter 98 and base 100 of transistor $Q_4$ are connected to one another through series resistance 102 and electrical power source such as battery 104. Inasmuch as transistor $Q_4$ is shown as an NPN transistor, base 100 is connected to the positive side of battery 104. A point intermediate resistor 102 and battery 104 is connected to the negative side of an electrical power source such as battery 106, the positive side of the latter being in turn connected to ground. While the constant current sources hereinbefore described rsepectively comprise transistors $Q_3$ and $Q_4$, it will be appreciated by those skilled in the art that the transistors may be replaced by fixed resistors, or other circuit elements, or other combinations thereof under appropriate circumstances in order to constitute constant current sources of appropriate polarity. Also, as hereinbefore described in connection with coupling network 28, while the latter is disclosed in FIG. 3 as comprising battery 28, it may also be formed as a direct connection between base resistor 30 and collector 24, or by a network of passive and active circuit components, or either. For instance, $Q_2$ can be considered the input stage of an operational amplifier whose ouput is connected to point 38. In such event, resistor 30 could be considered a feedback resistor around the operational amplifier and the latter would then constitute 28 coupling means 28.

Point 38, intermediate in the base-collector circuit of transistor $Q_2$ between battery 28 and resistor 30, is connected to the bases of transistors $Q_{1A}$ and $Q_{1B}$ respectively through resistances such a resistor 108 and resistor 110.

In operation, transistor $Q_2$ functions as hereinbefore described in connection with transistor $Q_2$ of FIGS. 1 and 2. The flow of current in base 32 produces at point 38 a voltage which is determined by the voltage drop across resistor 30 ($I_BR_B$) and by the base-emitter voltage of transistor $Q_2$. Again, it will be apparent that the current to base 32 driven by this voltage will be a thermally variable flow of the magnitude necessary to meet the requirement that the collector current of transistor $Q_2$ be at a substantially constant value. In view of the matched characteristics of transistors $Q_2$, $Q_{1A}$ and $Q_{1B}$, the same voltage when employed to drive a base current of the latter transistors, will ensure that the base currents thereof are also functions with respect to changes in the thermally variable characteristics of transistors $Q_{1A}$ and $Q_{1B}$. Such currents are provided in accordance with the values of resistances 108 and 110 and the voltage drops thereacross between the voltage that point 38 assumes and the respective base-emitter voltages of transistors 60 and 62. It is possible to select resistors 108 and 110 such that, in the absence of any signals from sources 76 and 78, the net current through resistors 72 and 74 will be very nearly zero over a wide range of temperatures when transistors $Q_{1A}$, $Q_{1B}$ and $Q_2$ are operated at the same temperatures. Hence, spurious voltage signals due to thermal changes are minimized, which signals would otherwise be confused with signals provided from sources 76 and 78.

Although the embodiments heretofore described have shown the amplifying and compensating transistors as being of the NPN conductivity type, it is to be understood that, as is well known, PNP transistors can be substituted with appropriate changes in the polarities of the biases and current sources. While the invention has been described in connection with amplifiers, it will be appreciated that bias compensation circuits of the type described can be used in many other networks wherein thermal variations in transistors require compensation, typically in oscillators, switching circuits and the like.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. An apparatus for providing compensation of thermally caused variations in the operation of a first transistor adapted to have input signals applied to the base thereof, said apparatus comprising, in combination:

a compensating transistor of the same conductivity type as said first transistor and having thermally variable characteristics substantially matched to the thermally variable characteristics of said first transistor;

means connected to the collector of said compensating transistor for providing a substantially constant current thereto;

a feedback loop coupling the base and collector of said compensating transistor for providing a thermally variable voltage for driving through the base of said compensating transistor a current established by the substantially constant collector current and thermal variations in said characteristics of said compensating transistor; and means connecting said loop and the base of said first transistor for generating a temperature compensating current in the base of said first transistor in dependence on said thermally variable voltage.

2. An apparatus as defined in claim 1 wherein said feedback loop comprises a resistive element in series with the base of said compensating transistor and means for coupling said element to the collector of said compensating transistor.

3. An apparatus as defined in claim 2 whereby said means for coupling said element is a battery poled for reverse biasing the collector-base junction of said compensating transistor.

4. An apparatus as defined in claim 2 wherein said means for coupling said element is a short circuit.

5. An apparatus as defined in claim 2 wherein said means for coupling said element is a voltage-regulating diode.

6. An apparatus as defined in claim 2 wherein said means for coupling said element is a non-inverting, isolating amplifier having a substantially infinite input impedance connected to the collector of said compensating transistor and having an output connected to said resistive element.

7. An apparatus as defined in claim 2 wherein said means for coupling said element is a resistance-capacitance network.

8. An apparatus for providing compensation of thermally caused variations in the operation of a first transistor, said apparatus comprising in combination:

a compensating transistor of the same conductivity type as said first transistor and having thermally variable characteristics of said first transistor;

means connected to the collector of said compensating transistor for providing a substantially constant current thereto;

a feedback loop coupling the base and collector of said compensating transistor for providing a thermally variable voltage for driving through the base of said compensating transistor a current established by the substantially constant collector current and thermal variations in said characteristics of said compensating transistor;

means connecting said loop through a resistance to the base of said first transistor so as to apply said voltage to said resistance; and means adapted for coupling the base of said first transistor to a source of signals.

9. An apparatus for providing compensation of thermally caused variations in the operation of a first transistor, said apparatus comprising in combination:

a compensating transistor of the same conductivity type as said first transistor and having thermally variable characteristics substantially matched to the thermally variable characteristics of said first transistor;

a substantially constant current source connected to the collector of said compensating transistor;

the emitters of both transistors being connected directly to a common reference terminal;

a first resistance connected to the base of said compensating transistor;

means for so coupling said collector to said resistance as to provide a voltage for driving through said base a current which varies as a function of ambient transistor temperature; and means connected through a second resistance to the base of said first transistor for applying said voltage to said second resistance.

10. An apparatus for providing compensation of thermally caused variations in the operation of a first transistor, said apparatus comprising in combination:

a compensating transistor of the same conductivity type as said first transistor and having thermally variable characteristics substantially matched to the thermally variable characteristics of said first transistor;

means for coupling substantially constant current source to the collector of said compensating transistor;

means connecting the emitters of both transistors to one another;

a first resistance having one terminal thereof coupled to the collector of said compensating transistor and the other terminal thereof connected to the base of said compensating transistor; and means connecting the one terminal of said resistance through a second resistance to the base of said first transistor.

11. Apparatus for providing compensation of a transistor in common emitter configuration, said apparatus comprising in combination:

a compensating transistor of the same conductivity type as said first transistor and having thermally variable characteristics matched to track the thermally variable characteristics of said first transistor;

a substantially constant current source connected to the collector of said compensating transistor;

a feed-back loop coupling the base and collector of said compensating transistor to one another for providing a thermally variable voltage for driving through the base of said compensating transistor a current established by the substantially constant collector current and thermal variations in the characteristics of said compensating transistor;

said feedback loop comprising at least a resistance, the emitters of said transistors being connected to one another;

means coupling said loop, through a second resistance to the base of said first transistor for applying said voltage to said second resistance;

means adapted for coupling the base of said first transistor to a source of current signals; and means adapted for coupling the collector of said first transistor to an output terminal.

12. Apparatus for providing compensation of a transistor in emitter-follower configuration, said apparatus comprising, in combination:

a compensating transistor of the same conductivity type as said first transistor and having thermally variable characteristics matched to track the thermally variable characteristics of said first transistor;

a first substantially constant current source connected to the collector of said compensating transistor;

a feed-back loop coupling the base and collector of said compensating transistor to one another for providing a thermally variable voltage for driving through the base of said compensating transistor a current established by the substantially constant collector current and thermal variation in the characteristics of said compensating transistor;

the emitters of said transistors being connected to one another, to a second substantially constant current source, and to an output terminal;

means for connecting the collector of said first transistor to a source of substantially constant voltage; and means for applying said thermally variable voltage through a resistance to the base of said first transistor.

13. Apparatus for providing compensation of at least a pair of transistors in differential amplifier configuration wherein said pair of transistors have mutually matched thermally variable characteristics and are of like conductivity type said apparatus comprising, in combination:

a compensating transistor of the same conductivity type as said pair of transistors and having thermally variable characteristics matched to track the thermally variable characteristics of said pair of transistors;

a first substantial constant current source connected to the collector of said compensating transistor;

a feed-back loop coupling the base and collector of said compensating transistor to one another for providing a thermally variable voltage for driving through the base of said compensating transistor a current established by the substantially constant collector current and thermal variation in the characteristics of said compensating transistor;

the emitters of said transistors being connected to one another and to a second substantially constant current source; and means for coupling said thermally variable voltage through respective resistances to the bases of said pair of transistors.

References Cited by the Examiner

UNITED STATES PATENTS 2,929,997 3/1960 Cluwen ------------- 330—18

ROY LAKE, *Primary Examiner.*

N. KAUFMAN, *Assistant Examiner.*